United States Patent
Sekiya et al.

(10) Patent No.: US 9,527,490 B2
(45) Date of Patent: Dec. 27, 2016

(54) CONTROL DEVICE FOR ELECTRICALLY-DRIVEN VACUUM PUMP

(71) Applicant: TOYOTA JIDOSHA KABUSHIKI KAISHA, Toyota-shi, Aichi (JP)

(72) Inventors: Yoshihide Sekiya, Chiryu (JP); Shoji Ozaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/796,710

(22) Filed: Jul. 10, 2015

(65) Prior Publication Data

US 2016/0052499 A1 Feb. 25, 2016

(30) Foreign Application Priority Data

Aug. 19, 2014 (JP) .................. 2014-166701

(51) Int. Cl.
| | |
|---|---|
| B60T 7/04 | (2006.01) |
| B60T 13/72 | (2006.01) |
| B60T 13/66 | (2006.01) |
| B60T 17/02 | (2006.01) |

(52) U.S. Cl.
CPC ............ B60T 13/72 (2013.01); B60T 7/042 (2013.01); B60T 13/662 (2013.01); B60T 17/02 (2013.01)

(58) Field of Classification Search
CPC .......... B60T 17/02; B60T 13/52; B60T 13/72; B60T 13/565
USPC .......................................... 303/12
See application file for complete search history.

(56) References Cited

U.S. PATENT DOCUMENTS

| | | | | | |
|---|---|---|---|---|---|
| 5,954,406 | A | * | 9/1999 | Sawada | B60T 7/12 303/10 |
| 5,971,500 | A | * | 10/1999 | Voges | B60T 7/042 188/356 |
| 6,324,845 | B1 | * | 12/2001 | Fulks | B60T 13/52 60/397 |
| 7,832,261 | B2 | * | 11/2010 | Kaestner | B60T 8/442 73/121 |
| 2003/0205127 | A1 | * | 11/2003 | Borsch | B60T 13/52 91/1 |
| 2003/0213239 | A1 | * | 11/2003 | Borsch | B60T 13/52 60/545 |
| 2004/0160119 | A1 | * | 8/2004 | Wagner | B60T 7/042 303/114.3 |
| 2006/0273659 | A1 | * | 12/2006 | Schluter | B60T 13/52 303/191 |
| 2010/0168978 | A1 | * | 7/2010 | Schubert | B60T 13/72 701/76 |

FOREIGN PATENT DOCUMENTS

JP  S63-212162 A  9/1988

* cited by examiner

*Primary Examiner* — Thomas J Williams
*Assistant Examiner* — James Hsiao
(74) *Attorney, Agent, or Firm* — Oliff PLC

(57) ABSTRACT

The invention relates to a control device for an electrically-driven vacuum pump. The control device stops operation of an electrically-driven vacuum pump for generating negative pressure in a negative pressure chamber of a brake booster when the vacuum pump is operated and a gradient of increasing of a booster negative pressure representing a magnitude of a difference between pressure in the negative pressure chamber and the atmospheric pressure is smaller than or equal to a predetermined stop gradient threshold.

6 Claims, 7 Drawing Sheets

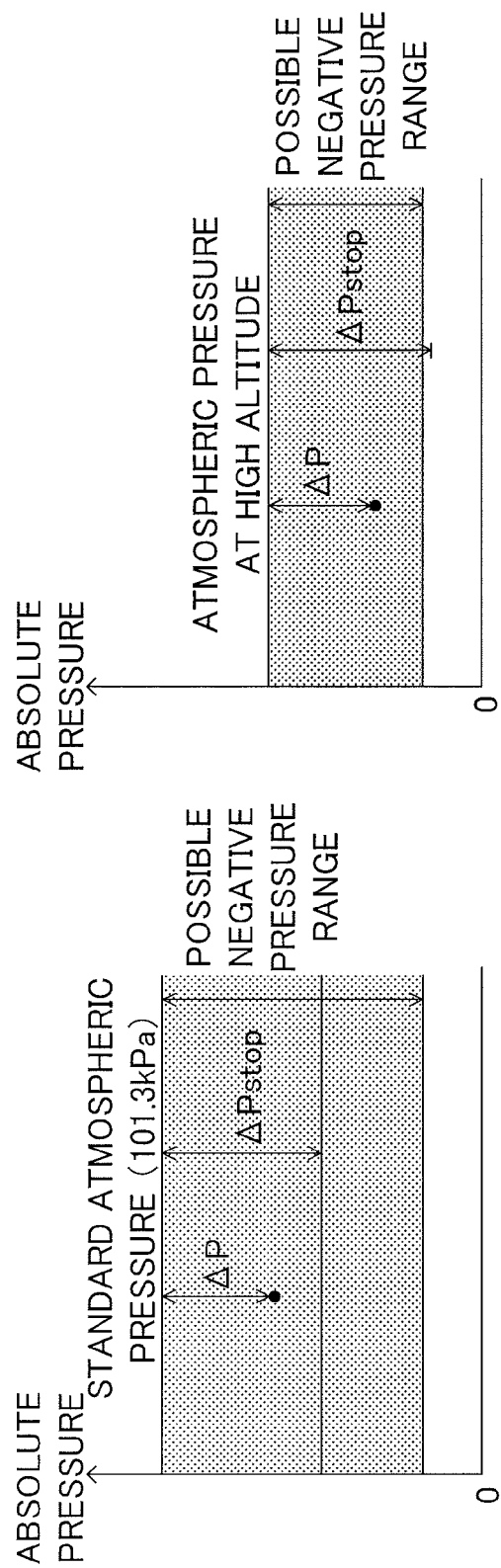

CONTROL DEVICE FOR ELECTRICALLY-DRIVEN VACUUM PUMP

BACKGROUND OF THE INVENTION

Field of the Invention

The invention relates to a control device for an electrically-driven vacuum pump for generating a negative pressure in a negative pressure chamber of a brake booster of a vehicle.

Description of the Related Art

Conventionally, there is known a brake booster operated by a negative pressure generated by an electrically-driven vacuum pump. A control device for the electrically-driven vacuum pump is described in Unexamined Japanese Patent Publication No. 63-212162. The control device controls operation of the vacuum pump to keep a sufficient negative pressure in the brake booster. This control device starts the operation of the vacuum pump when the state of the brake device changes from an operating state to a non-operating state.

On the other hand, the control device stops the operation of the vacuum pump when the negative pressure in the brake booster detected by a negative pressure sensor becomes larger than or equal to an upper limit set value. Thereby, even when the decrease of the negative pressure in the brake booster is small to the extent that a negative pressure switch is not operate, the vacuum pump is certainly started to be operated. Thus, the shortage of a braking force is prevented from occurring. Note that the term "negative pressure" means a magnitude of the negative pressure in this specification and the claims.

SUMMARY OF THE INVENTION

However, the atmospheric pressure is low at a high altitude. Therefore, the negative pressure which can be generated by the electrically-driven vacuum pump is small at the high altitude. That is, a large difference (the large negative pressure) between the pressure in the brake booster and the atmospheric pressure cannot be generated. FIG. 7(A) shows a range of the negative pressure which can be generated in the brake booster by the vacuum pump when the atmospheric pressure corresponds to the standard atmospheric pressure (101.3 kPa). On the other hand, FIG. 7(B) shows a range of the negative pressure which can be generated in the brake booster by the vacuum pump at the high altitude where the atmospheric pressure is low. Hereinafter, the magnitude of the difference between the pressure in the brake booster generated by the vacuum pump and the atmospheric pressure will be referred to as "booster pressure $\Delta P$."

For example, as shown in FIG. 7(A), the control device for the vacuum pump stops the operation of the vacuum pump when the booster negative pressure $\Delta P$ exceeds a threshold $\Delta P$stop. On the other hand, as shown in FIG. 7(B), when the vehicle travels at the high altitude, the negative pressure which can be generated in the brake booster by the vacuum pump becomes small. Therefore, the booster negative pressure $\Delta P$ cannot reach the threshold $\Delta P$stop and thus, the operation of the vacuum pump may not be stopped. In this case, the consumption of the power increases and thus, the consumption of the fuel increases.

The invention solve the problem described above and the object of the invention is to provide a control device for an electrically-driven vacuum pump which can certainly stop the operation of the vacuum pump while an appropriate negative pressure is generated.

A control device for an electrically-driven vacuum pump according to the invention is applied to a vehicle having:
a brake pedal (2);
a brake booster (10) including a negative pressure chamber (11a), the brake booster serving to generate an assist force for assisting operation of the brake pedal (2); and
an electrically-driven vacuum pump (30) for generating negative pressure in the negative pressure chamber (11a).

The control device according to the invention comprises a control part (40) which controls operation of the vacuum pump (30).

To accomplish the object described above, the control part (40) is programmed to stop the operation of the vacuum pump (30) when satisfied is a predetermined condition where the vacuum pump (30) is operated (step S13 of FIGS. 2 and 5) and a gradient ($\Delta P'$) of increasing of a booster negative pressure ($\Delta P$) representing a magnitude of a difference between a pressure in the negative pressure chamber (11a) and the atmospheric pressure is smaller than or equal to a predetermined stop gradient threshold ($\Delta P'$stop) (it is determined Yes at step S16 of FIGS. 2 and 5).

In the case where the vehicle further has a negative pressure sensor (50) for outputting a signal representing the booster negative pressure ($\Delta P$), the control part (40) may be programmed to acquire the booster negative pressure ($\Delta P$) on the basis of the signal output from the negative pressure sensor (50) (step S14 of FIGS. 2 and 5).

The control device for the vacuum pump according to the invention comprises the control part which controls the operation of the vacuum pump for generating the negative pressure in the negative pressure chamber of the brake booster of the vehicle. In order to appropriately operate the brake booster, the control part needs to maintain the booster negative pressure within a predetermined range, which booster negative pressure represents the magnitude (pressure difference) of the difference between the pressure in the negative pressure chamber of the brake booster and the atmospheric pressure. However, the atmospheric pressure is low at a high altitude. Therefore, the booster negative pressure which the vacuum pump can generate, is small. Thus, if the operation of the vacuum pump is controlled on the basis of the booster negative pressure, the booster negative pressure may not reach the stop threshold.

While the vacuum pump is operated, the magnitude of the difference between the pressure in the negative pressure chamber and the atmospheric pressure, that is, the booster negative pressure increases. As the negative pressure is increased by the vacuum pump (that is, as time proceeds), the gradient of the increasing of the booster negative pressure (an amount of the increasing of the negative pressure per unit time, that is, a time increasing rate of the negative pressure) decreases.

The control part according to the invention is programmed to stop the operation of the vacuum pump when satisfied is the predetermined condition where the vacuum pump is operated and the gradient of the increasing of the booster negative pressure is smaller than or equal to the predetermined stop gradient threshold. Thereby, independently of the altitude where the vehicle exists, the operation of the vacuum pump can be stopped after the appropriate negative pressure is generated in the negative pressure chamber.

Note that the operation of the vacuum pump may be started at an optional timing.

For example, the control part (40) may be programmed to start the operation of the vacuum pump (30) (step S13 of FIGS. 2 and 5) when satisfied is a condition where the operation of the vacuum pump (30) is stopped and the booster negative pressure (ΔP) is smaller than or equal to a predetermined pump operation start threshold (ΔPstart) (it is determined Yes at step S12 of FIGS. 2 and 5).

Otherwise, the control part (40) may be programmed to start the operation of the vacuum pump (30) when satisfied is a condition where the operation of the vacuum pump (30) is stopped and the operation of the brake pedal (2) is ended.

Further, the predetermined condition may include a condition where the brake pedal (2) is not operated. In this case, the control part (40) may be programmed to stop the operation of the vacuum pump (30) (step S17 of FIG. 5) and store the booster negative pressure (ΔP) at the timing of stopping the operation of the vacuum pump (30) (step S19 of FIG. 5) when the predetermined condition is satisfied (it is determined No at step S18 and it is determined Yes at step S16).

Further, the control part (40) may be programmed to stop the operation of the vacuum pump (30) (step S17 of FIG. 5) when satisfied is a condition where the vacuum pump (30) is operated, the brake pedal (2) is operated and the booster negative pressure (ΔP) is larger than or equal to a stop negative pressure threshold set depending on the stored booster negative pressure (ΔPmemo) (it is determined Yes at steps S18 and S21 of FIG. 5).

Further, in the case where the vehicle further has a brake operation detection device (60) for outputting a signal representing the operation of the brake pedal (2), the control part (40) may be programmed to judge whether or not the brake pedal (2) is operated on the basis of the signal output from the brake operation detection device (60).

The brake operation detection device may detect the operation of the brake pedal by using a stop lamp switch or a brake pedal stroke sensor or a master cylinder pressure sensor. Otherwise, the brake operation detection device may detect the operation of the brake pedal on the basis of a deceleration detected by an acceleration sensor for detecting an acceleration of a vehicle body in a longitudinal direction of the vehicle body.

Note that the stop negative pressure threshold is preferably set to the same value or the generally same value as the stored booster negative pressure.

While the brake pedal is operated, the negative pressure in the brake booster decreases (the negative pressure is consumed). Therefore, even if the vacuum pump is operated, the increasing of the negative pressure by the vacuum pump may be countered by the decreasing of the negative pressure due to the operation of the brake pedal. In this case, even when the booster negative pressure is small, the gradient of the increasing of the booster negative pressure may become smaller than or equal to the stop gradient threshold. At this time, the operation of the vacuum pump is stopped when the booster negative pressure is smaller than a target negative pressure.

According to the invention, in the case where the predetermined condition include the condition where the brake pedal is not operated, the control part is programmed to stop the operation of the vacuum pump and store the booster negative pressure at the timing of stopping the operation of the vacuum pump when the predetermined condition is satisfied.

Further, the control part is programmed to stop the operation of the vacuum pump when satisfied is a condition where the vacuum pump is operated, the brake pedal is operated and the booster negative pressure is larger than or equal to the stop negative pressure threshold set depending on the stored booster negative pressure. Thereby, independently of whether or not the brake pedal is operated, the operation of the vacuum pump can be appropriately stopped at the high altitude.

In the above description, for facilitating understanding of the invention, the components of the invention corresponding to components of embodiments described later, respectively, are accompanied with symbols used in the embodiments. However, the components of the invention are not limited to the components of the embodiments defined by the symbols, respectively.

BRIEF DESCRIPTION OF THE DRAWINGS

FIGS. 7(A) and 7(B) are a graphs showing a possible range of the negative pressure generated by the vacuum pump, respectively.

DESCRIPTION OF THE PREFERRED EMBODIMENTS

Figure 1:
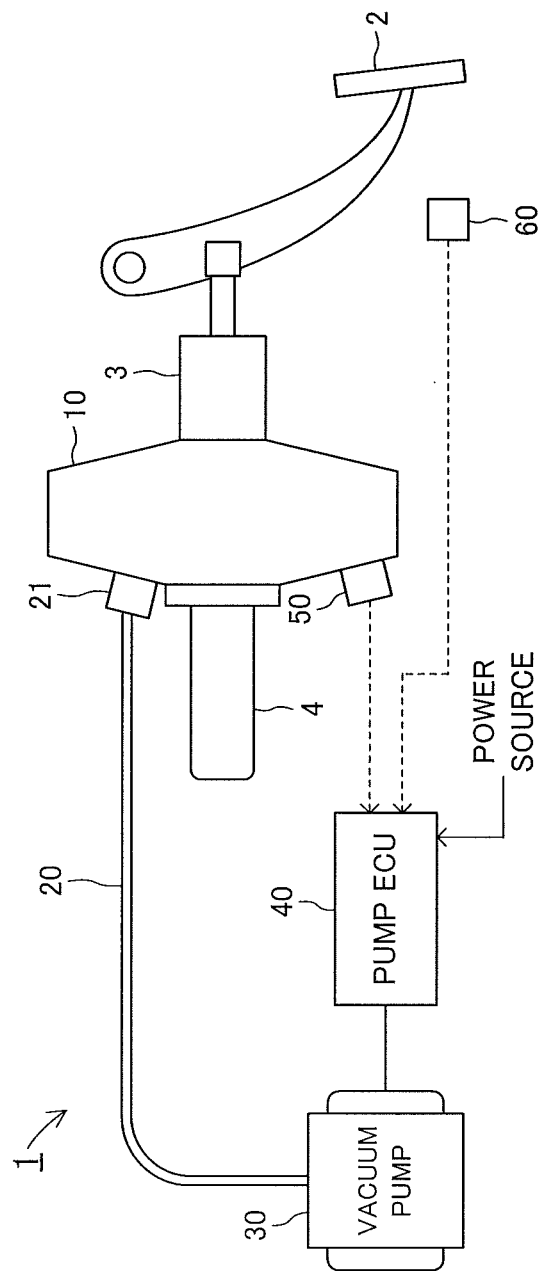
FIG. 1 is a schematic configuration view of a brake booster device according to an embodiment.

Below, a control device of an electrically-driven vacuum pump according to embodiments of the invention will be described with reference to the drawings. FIG. 1 is a schematic configuration view of a brake booster device 1 of a vacuum type according to an embodiment. The brake booster device 1 has a brake booster 10 of a vacuum type, an electrically-driven vacuum pump 30 and a pump control device 40. The vacuum pump 30 serves to increase negative pressure in the brake booster 10 (in particular, a negative pressure chamber 11 described later) through a vacuum hose 20. The pump control device 40 serves to control operation of the vacuum pump 30. A check valve 21 is provided at a connection port of the brake booster 10. The vacuum hose 20 is connected to the connection port of the brake booster 10.

The brake booster 10 is provided between a brake pedal 2 of a vehicle and a master cylinder (not shown in FIG. 1) and serves to assist driver's operation of the brake pedal 2 to advance a push rod 4 (see FIG. 6) with a force larger than a force of depressing the brake pedal 2 exerted by the driver to operate a power piston 12 (see FIG. 6) of the master cylinder. The brake booster 10 is well-known and thus, the detailed description of the brake booster 10 with reference to the drawings is omitted and only a principle of the operation of the brake booster 10 will be described.

Figure 6:
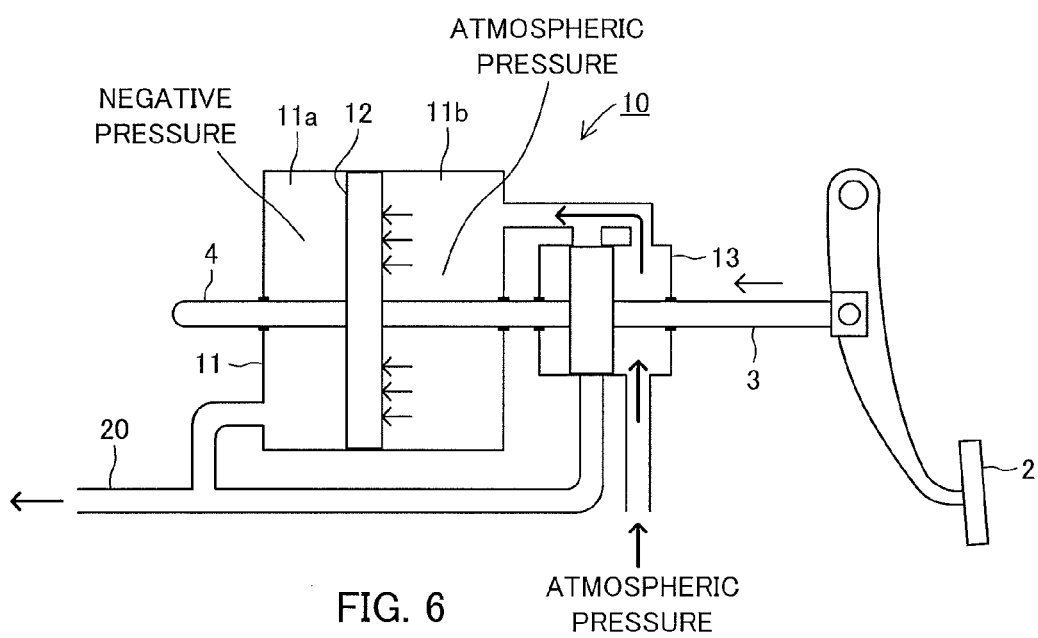
FIG. 6 is a view for describing a principle of operation of the brake booster.

For example, as shown in FIG. 6, the brake booster 10 has a power cylinder 11 therein. The power piston 12 is provided in the power cylinder 11. The power piston 12 separates an interior of the power cylinder 11 into a negative pressure chamber 11a and an atmospheric pressure chamber 11b. The power piston 12 is connected to the brake pedal 2 via a valve operating rod 3. The negative pressure chamber 11a always communicates with the vacuum pump 30 via the vacuum hose 20. When the brake pedal 2 is not depressed by the driver, a valve mechanism makes the atmospheric pressure chamber 11b communicate with the vacuum pump 30 via the vacuum hose 20. On the other hand, when the brake pedal 2 is depressed by the driver, the valve mechanism 13 shuts off the communication of the atmospheric pressure chamber 11b with the vacuum pump 30 and make the atmospheric pressure chamber 11b communicate with the atmospheric air. Therefore, when the brake pedal 2 is not depressed, the pressure in the atmospheric pressure chamber 11b is the same as the pressure in the negative pressure chamber 11a. On the other hand, when the brake pedal is depressed, the atmospheric air flows into the atmospheric pressure chamber 11b and a difference in pressure between the atmospheric pressure chamber 11b and the negative pressure chamber 11a occurs. This difference in the pressure generates assist force for advancing the push rod 4 by the power piston 12. The brake booster 10 is configured to maintain the difference in the pressure constant when stroke of the depressing the brake pedal 2 is maintained constant.

Again, with reference to FIG. 1, a pressure sensor 50 is provided on the brake booster 10. The pressure sensor 50 serves to detect the difference $\Delta P$ in the pressure between the negative pressure in the brake booster 10 (the pressure in the negative pressure chamber 11a) and the atmospheric air. Hereinafter, this difference $\Delta P$ in the pressure will be referred to as "booster negative pressure $\Delta P$" and the pressure sensor 50 will be referred to as "negative pressure sensor 50." The booster negative pressure $\Delta P$ corresponds to magnitude (an absolute value) of the difference $\Delta P$ in the pressure.

The pump control device 40 is an electronic control unit including a calculation circuit and a drive circuit. The calculation circuit includes a microcomputer as a main part. The drive circuit serves to drive an electrically-driven motor of the vacuum pump 30. Hereinafter, the pump control device 40 will be referred to as "pump ECU 40." A detection signal output from the negative pressure sensor 50 is input to the pump ECU 40. Further, a detection signal output from a brake operation detection device 60 is input to the pump ECU 40. The brake operation detection device 60 outputs the detection signal used to determine whether or not the brake pedal 2 is operated by the driver. For example, a stop lamp switch or a brake pedal stroke sensor or a master cylinder pressure sensor may be employed as the brake operation detection device 60. An acceleration sensor for detecting acceleration of a vehicle body in a longitudinal direction of the vehicle body may be employed as the brake operation detection device 60. Deceleration of the vehicle body is generated when the brake pedal 2 is operated by the driver. Thus, the operation of the brake pedal 2 can be estimated and detected on the basis of the deceleration of the vehicle body.

Pump Control Routine According to First Embodiment

Figure 2:
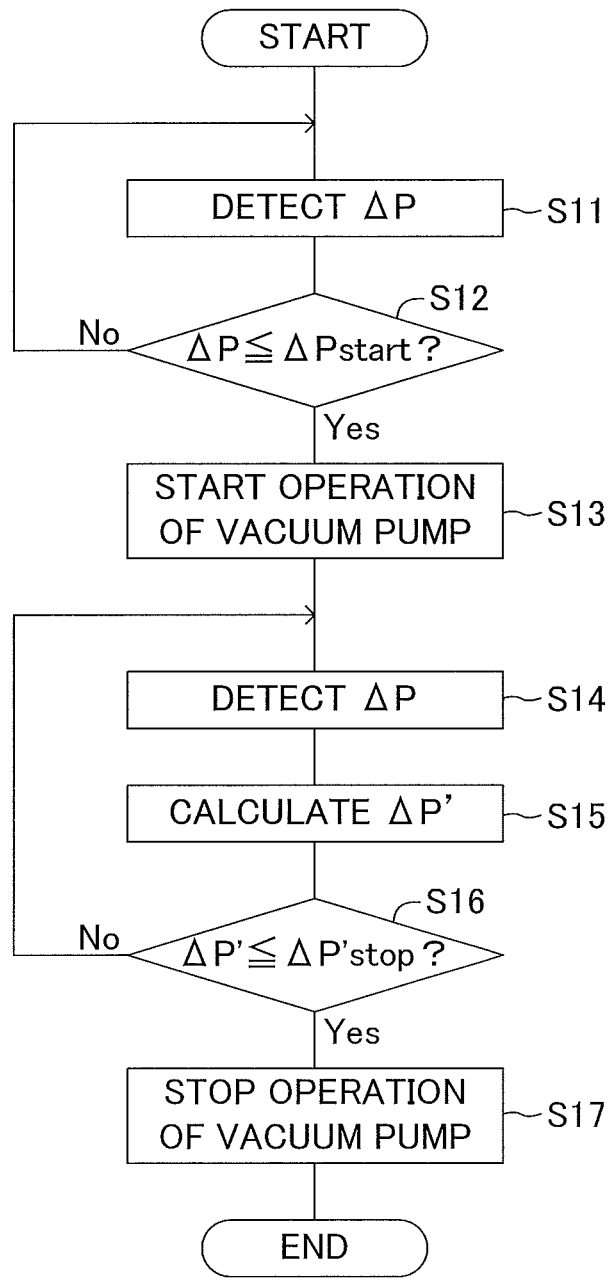
FIG. 2 is a flowchart of a pump control routine according to a first embodiment executed by a pump ECU.

Next, a pump control routine executed by a CPU of the pump ECU 40 will be described. FIG. 2 shows a flowchart of the pump control routine according to a first embodiment. When the pump control routine starts, the pump ECU 40 reads a signal output from the negative pressure sensor 50 and, on the basis of this read signal, detects the booster negative pressure $\Delta P$ at the step S11. Next, at the step S12, the pump ECU 40 determines whether or not the detected booster negative pressure $\Delta P$ is smaller than or equal to a pump operation start threshold $\Delta P$start. When the booster negative pressure $\Delta P$ is larger than the pump operation start threshold $\Delta P$start, the pump ECU 40 returns to the step S11. The pump ECU 40 repeats such the processes at a predetermined calculation cycle. When the pump ECU 40 detects that the booster negative pressure $\Delta P$ becomes smaller than or equal to the pump operation start threshold $\Delta P$start, the pump ECU 40 determines "Yes" at the step S12 and proceeds to the next step S13 to start the operation of the vacuum pump 30. Note that when this routine is executed during the operation of the vacuum pump 30, the processes of the steps S11 to S13 are not executed, but the step S14 is executed directly.

Figures 3A, 3B:
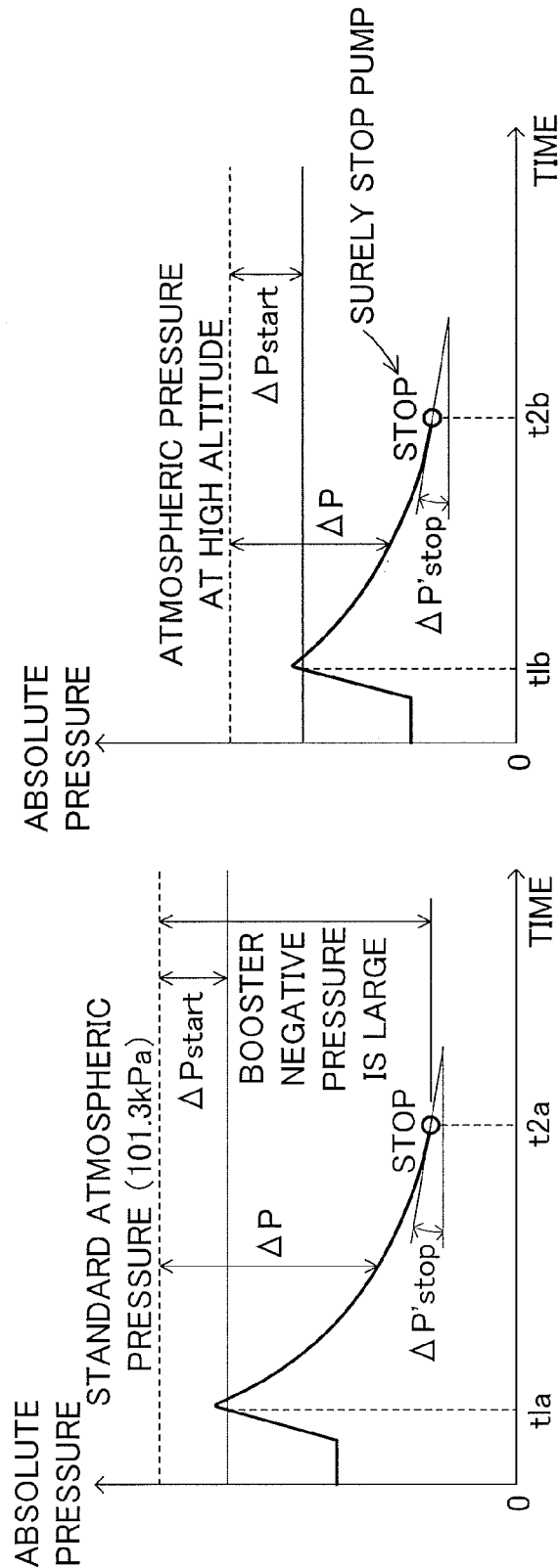
FIGS. 3(A) and 3(B) are views for describing operation of a vacuum pump.

The brake booster 10 generates assist force by the difference in pressure between the atmospheric pressure chamber 11 and the negative pressure chamber 11a. Thus, it is necessary to maintain the booster negative pressure $\Delta P$ larger than and equal to a predetermined value. This predetermined value is set as the pump operation start threshold $\Delta P$start. The pump operation start threshold $\Delta P$start is constant, independently of the atmospheric pressure at a location where the vehicle exists. Therefore, the pressure (the absolute pressure) in the negative pressure chamber 11a at the timing of the start of the operation of the vacuum pump 30 when the vehicle exists at a high altitude, that is, when the atmospheric pressure is lower than the standard atmospheric pressure as shown in FIG. 3(B), is lower than the pressure (the absolute pressure) in the negative pressure chamber 11a at the timing of the start of the operation of the vacuum pump 30 when the vehicle exists at a low altitude, that is, when the atmospheric pressure corresponds to the standard atmospheric pressure as shown in FIG. 3(A). In the example shown in FIG. 3(A) the booster negative pressure $\Delta P$ becomes smaller than or equal to the pump operation start threshold $\Delta P$start at a timing t1b and the vacuum pump 30 is started to be operated. In the example shown in FIG. 3 (B) the booster negative pressure $\Delta P$ becomes smaller than or equal to the pump operation start threshold $\Delta P$start at a timing t1b and the vacuum pump 30 is started to be operated. Note that in FIGS. 3(A) and 3(B) the booster negative pressure $\Delta P$ is expressed by a height in the negative direction from the atmospheric pressure.

After the pump ECU 40 starts the operation of the vacuum pump 30 at the step S13, the pump ECU 40 reads the signal output from the negative pressure sensor 50 and on the basis of this read signal, detects the booster negative pressure $\Delta P$ at the next step S14. Next, at the step S15, the pump ECU 40 calculates a gradient of the increasing of the booster negative pressure $\Delta P$ detected at the step S14, that is, a value obtained by differentiating the detected booster negative pressure $\Delta P$ with respect to the time. Next, at the step S16, the pump ECU 40 determines whether or not a negative pressure increasing gradient $\Delta P'$ corresponding to the gradient of the increasing of the booster negative pressure $\Delta P$ calculated at the step S15 is smaller than or equal to a previously determined stop gradient threshold $\Delta P'$stop. When the negative pressure increasing gradient $\Delta P'$ is larger than the stop gradient threshold $\Delta P'$stop, the pump ECU 40 returns to the step S14. The pump ECU 40 repeats such processes at a predetermined calculation cycle and when the pump ECU 40 detects that the negative increasing gradient $\Delta P'$ becomes smaller than or equal to the stop gradient threshold $\Delta P'$stop, the pump ECU 40 determines "Yes" at the step S16 and proceeds to the next step S17 to stop the operation of the vacuum pump 30. Then, the pump ECU 40 once terminates this pump control routine and then, starts the pump control routine, again.

Figure 4:
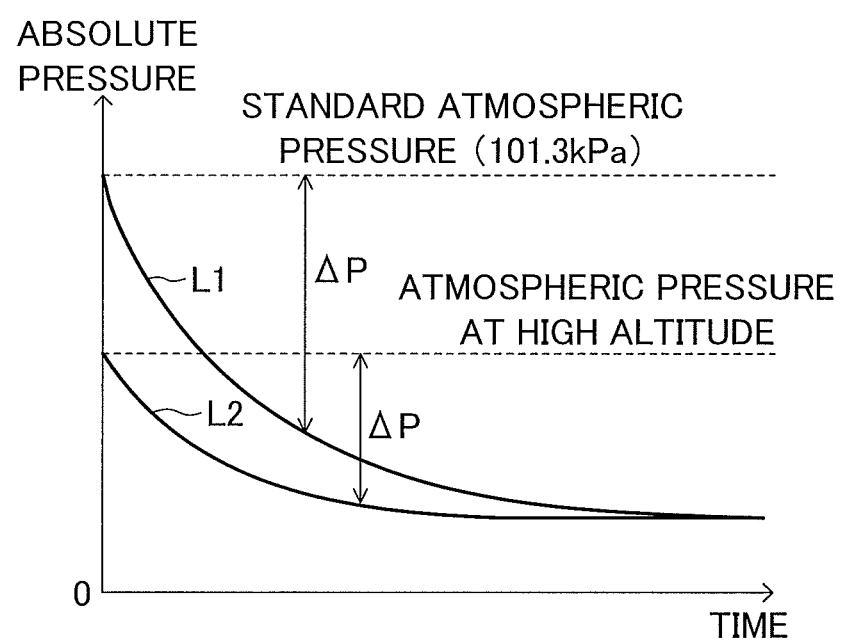
FIG. 4 is a graph showing change of a booster negative pressure.

FIG. 4 shows change of the booster negative pressure ΔP after the vacuum pump 30 is started to be operated when the pressure in the brake booster 10 corresponds to the atmospheric pressure. A line L1 shows change of the booster negative pressure ΔP when the atmospheric pressure corresponds to the standard atmospheric pressure (101.3 kPa). On the other hand, a line L2 shows change of the booster negative pressure ΔP when the atmospheric pressure is lower than the standard atmospheric pressure. At the initial duration after the vacuum pump 30 is started to be operated, the booster negative pressure ΔP increases at a large rate and then, the rate of the increasing of the booster negative pressure ΔP gradually decreases. The rate of the increasing of the booster negative pressure ΔP finally becomes constant. In this case, as show in the lines L1 and L2 of FIG. 4, the final booster negative pressure ΔP when the atmospheric pressure is lower than the standard atmospheric pressure, is different from (smaller than) the final booster negative pressure ΔP when the atmospheric pressure corresponds to the standard atmospheric pressure. However, the final pressure (the final absolute pressure) in the brake booster 10 when the atmospheric pressure is lower than the standard atmospheric pressure, is the same as the final pressure (the final absolute pressure) in the brake booster 10 when the atmospheric pressure corresponds to the standard atmospheric pressure.

In the conventional device, the vacuum pump is stopped when the booster negative pressure ΔP exceeds a previously determined stop threshold ΔPstop. In this case, under the state where the vehicle travels at a high altitude and thus, the atmospheric pressure is low, the booster negative pressure ΔP may not exceed the stop threshold ΔPstop even when the booster negative pressure ΔP is increased by the operation of the vacuum pump 30 and reaches the maximum value. To the contrary, in the embodiment, the vacuum pump 30 is stopped on the basis of the negative pressure increasing gradient ΔP' of the booster negative pressure ΔP detected by the negative pressure sensor 50. Therefore, the negative pressure increasing gradient ΔP' certainly becomes smaller than or equal to the stop gradient threshold ΔP'stop at a certain timing, independently of the magnitude of the atmospheric pressure.

For example, when the atmospheric pressure corresponds to the standard atmospheric pressure as shown in FIG. 3(A) the negative pressure increasing gradient ΔP' becomes smaller than or equal to the stop gradient threshold ΔP'stop at a timing t2a and then, the operation of the vacuum pump 30 is stopped. On the other hand, when the atmospheric pressure is lower than the standard atmospheric pressure as shown in FIG. 3(B), the negative pressure increasing gradient ΔP' becomes smaller than or equal to the stop gradient threshold ΔP'stop at a timing t2b and then, the operation of the vacuum pump 30 is stopped. In the conventional device, if the stop threshold ΔPstop is set to a small value, the operation of the vacuum pump 30 may be stopped even when the vehicle travels at the high altitude. However, in this case, the large booster negative pressure cannot be obtained when the atmospheric pressure corresponds to the standard atmospheric pressure. To the contrary, in the embodiment, as shown in FIG. 3(A), the large booster negative pressure ΔP can be obtained.

By the pump control routine according to the first embodiment described above, the operation of the vacuum pump 30 can be certainly stopped while the appropriate booster negative pressure can be obtained, independently of the altitude of the location where the vehicle exists. Therefore, the amount of the electric power consumed by the vacuum pump 30 can be reduced and the fuel consumption can be reduced.

Pump Control Routine According to Second Embodiment

Next, a pump control routine according to a second embodiment will be described. When the brake pedal is operate, the negative pressure in the brake booster 10 decreases. Therefore, even when the vacuum pump 30 is operated, the increasing of the negative pressure by the vacuum pump 30 may be countered by the decreasing of the negative pressure by the operation of the brake pedal. In this case, when the booster negative pressure ΔP is small, the negative pressure increasing gradient ΔP' may be smaller than or equal to the stop gradient threshold ΔP'stop. Accordingly, the operation of the vacuum pump 30 may be stopped even when the booster negative pressure ΔP is smaller than a target negative pressure. The pump control routine according to the second embodiment improves such a case.

Figure 5:
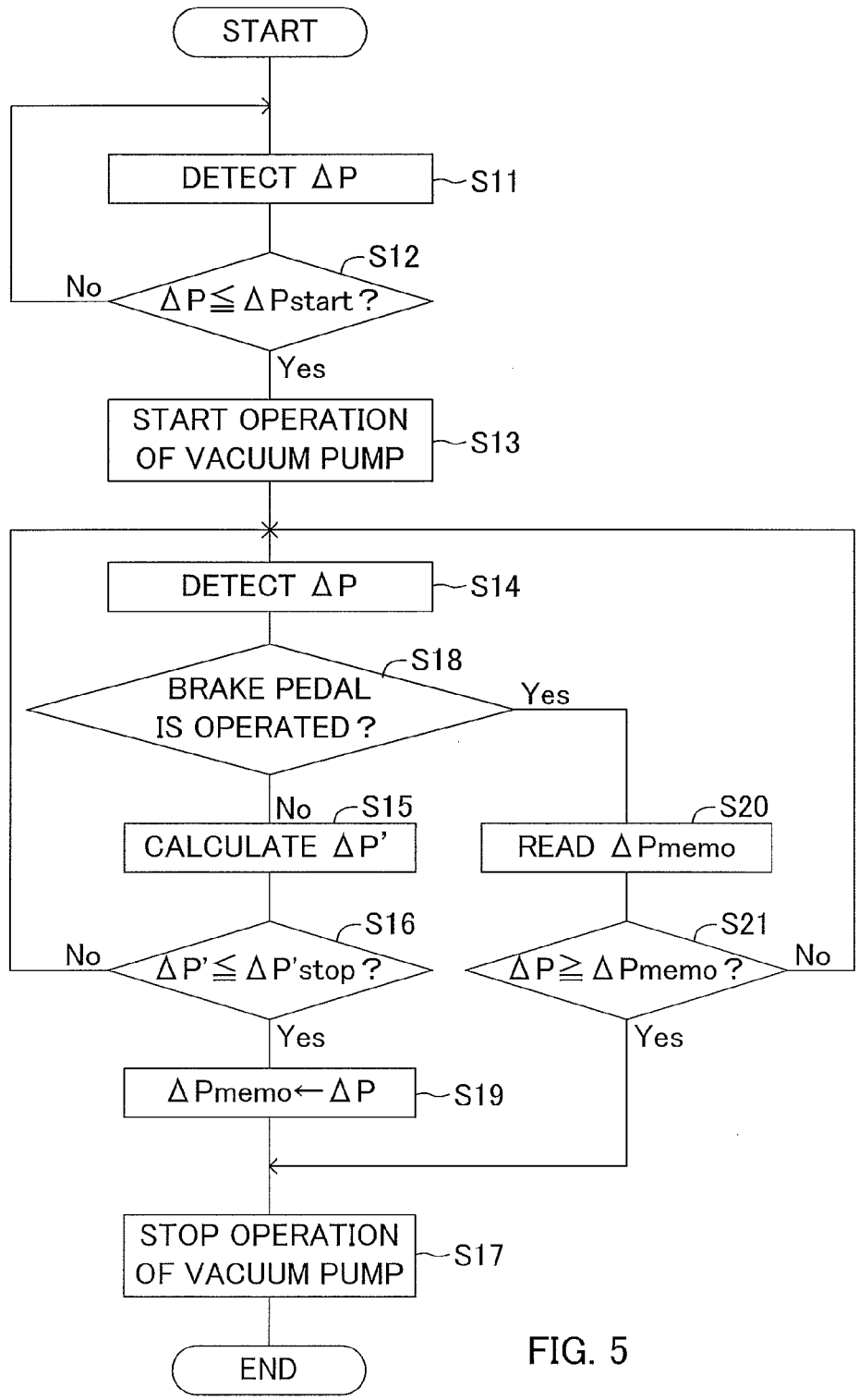
FIG. 5 is a flowchart of a pump control routine according to a second embodiment executed by a pump ECU.

FIG. 5 shows a pump control routine according to the second embodiment. The same processes of the pump control routine according to the second embodiment as the processes of the pump control routine according to the first embodiment are accompanied with the same step symbols as the step symbols of FIG. 2, respectively and the descriptions of those processes will be described briefly. When the pump control routine shown in FIG. 5, the pump ECU 40 reads the signal output from the negative pressure sensor 50 and on the bassi of this read signal, detects the booster negative pressure ΔP at the step S11 and then, at the step S12, the pump ECU 40 determines whether or not the detected booster negative pressure ΔP is smaller than or equal to the pump operation start threshold ΔPstart. When the pump ECU 40 detects that the booster negative pressure ΔP becomes smaller than or equal to the pump operation start threshold ΔPstart at the step S12, the pump ECU 40 proceeds to the step S13 to start the operation of the vacuum pump 30. Then, at the step S14, the pump ECU 40 reads the signal output from the negative pressure sensor 50 and on the basis of the read signal, detects the booster negative pressure ΔP.

Next, at the step S18, the pump ECU 40 reads a detection signal output from the brake operation detection device 60 and on the basis of this read detection signal, determines whether or not the driver operates the brake pedal 2. For example, the pump ECU 40 determines that the driver operates the brake pedal 2 when the stop lamp switch is ON or when a detection value output from the brake pedal stroke sensor is larger than or equal to a pedal operation determination threshold or when a detection value output from the master cylinder pressure sensor is larger than or equal to a pedal operation determination threshold. Otherwise, the pump ECU 40 determines that the driver operates the brake pedal 2 when a deceleration of the vehicle body detected by an acceleration sensor is larger than or equal to a pedal operation determination threshold.

When the pump ECU 40 determines that the brake pedal 2 is not operated, the pump ECU 40 determines "No" at the step S18 and proceeds to the step S15 to calculate a negative pressure increasing gradient ΔP' corresponding to a gradient of the increasing of the booster negative pressure ΔP detected at the step S14 and then, the pump ECU 40 proceeds to the step S16 to determine whether or not the calculated negative pressure increasing gradient ΔP' is smaller than or equal to a previously determined stop gradient threshold ΔP'stop. When the negative pressure increasing gradient ΔP' is larger than the threshold ΔP'stop, the pump ECU 40 returns to the step S14. The pump ECU 40 repeats such processes at a predetermined calculation cycle and when the exu 40 detects that the negative pressure increasing gradient ΔP' becomes smaller than or equal to the threshold ΔP'stop, the pump ECU 40 determines "Yes" at the step S16 and proceeds to the step S19. At the step S19, the pump ECU 40 stores the current booster negative pressure ΔP as a stop booster negative pressure ΔPmemo in a non-volatile memory (not shown). In the non-volatile memory, the stop booster negative pressure ΔPmemo has been stored at the last process of the step S19. Therefore, at the step S19, the stop booster negative pressure ΔPmemo is updated.

Next, at the step S17, the pump ECU 40 stops the operation of the vacuum pump 30. Then, the pump ECU 40 once terminates this pump control routine and then, the pump ECU 40 starts the pump control routine, again. In this case, the process of the step S17 is executed at the generally same time as the execution of the process of the step S19. Thus, the stop booster negative pressure ΔPmemo stored at the step S19 corresponds to the booster negative pressure ΔP at the timing of the stop of the operation of the vacuum pump 30. Note that the process of the step S19 may be executed immediately after the execution of the process of the step S17. This is because the booster negative pressure ΔP immediately after the stop of the operation of the vacuum pump 30 is substantially the same as the booster negative pressure ΔP immediately before the stop of the operation of the vacuum pump 30.

On the other hand, when the vacuum pump 30 is operated and the brake pedal 2 is operated, the pump ECU 40 determines "Yes" at the step S18 and proceeds to the step S20. At the step S20, the pump ECU 40 reads the stop booster negative pressure ΔPmemo stored in the non-volatile memory. Next, at the step S21, the pump ECU 40 determines whether or not the current booster negative pressure ΔP (the booster negative pressure ΔP detected at the step S14) is larger than or equal to the stop booster negative pressure ΔPmemo read at the step S20. When the booster negative pressure ΔP is smaller than the stop booster negative pressure ΔPmemo, the pump ECU 40 determines "No" at the step S21 and then, returns to the step S14 to repeat the processes described above.

When the pump ECU 40 determines that the booster negative pressure ΔP becomes larger than or equal to the stop booster negative pressure ΔPmemo during the operation of the brake pedal, the pump ECU 40 determines "Yes" at the step S21 and proceeds to the step S17 to stop the operation of the vacuum pump 30. Then, the pump ECU 40 once terminates this pump control routine. Then, the pump ECU 40 starts the pump control routine when the predetermined calculation cycle has elapsed.

By the pump control routine according to the second embodiment, when the negative pressure increasing gradient ΔP becomes smaller than or equal to the stop gradient threshold ΔP'stop while the operation of the brake pedal 2 is not detected, the operation of the vacuum pump 30 is stopped. In addition, the booster negative pressure ΔP at this stop of the operation of the vacuum pump 30 is stored as the stop booster negative pressure ΔPmemo. On the other hand, when the operation of the brake pedal 2 is detected, the relationship between the booster negative pressure ΔP and the stop booster negative pressure ΔPmemo is used in place of the relationship between the negative increasing gradient ΔP and the stop gradient threshold ΔP'stop. That is, when the booster negative pressure ΔP becomes larger than or equal to the stop booster negative pressure ΔPmemo, the operation of the vacuum pump 30 is stopped.

Therefore, while the negative pressure in the brake booster 10 decreases due to the operation of the brake pedal 2, whether or not the operation of the vacuum pump 30 is stopped, is determined by using the relationship between the booster negative pressure ΔP and the stop booster negative pressure ΔPmemo. Thus, the operation of the vacuum pump 30 is prevented from being stopped before the booster negative pressure ΔP reaches the target negative pressure. Therefore, the operation of the vacuum pump 30 can be appropriately stopped even at the high altitude, independently of whether or not the brake pedal 2 is operated.

The embodiments of the control device for the electrical-driven vacuum pump according to the invention has been described. However, the invention is not limited to the embodiments described above and various modifications can be employed without departing the object of the invention.

For example, in the pump control routine according to the second embodiment, the stop booster negative pressure ΔPmemo stored in the non-volatile memory is used as a threshold for determining whether or not the operation of the vacuum pump 30 should be stopped. However, the threshold for determining whether or not the operation of the vacuum pump 30 should be stopped is not limited to the same value as the stop booster negative pressure ΔPmemo and may be a value set, depending on the stop booster negative pressure ΔPmemo, that is, a value correlated with the stop booster negative pressure ΔPmemo.

What is claimed is:

1. A control device for an electrically-driven vacuum pump, applied to a vehicle having:
   a brake pedal;
   a brake booster having a negative pressure chamber, the brake booster serving to generate an assist force which assists operation of the brake pedal; and
   an electrically-driven vacuum pump for generating negative pressure in the negative pressure chamber,
   the control device comprising a control part which controls operation of the vacuum pump,
   wherein the control part is programmed to stop the operation of the vacuum pump when satisfied is a predetermined condition where the vacuum pump is operated and a gradient of increasing of a booster negative pressure representing a magnitude of a difference between pressure in the negative pressure chamber and the atmospheric pressure is smaller than or equal to a predetermined stop gradient threshold, the gradient of increasing the booster negative pressure being a value obtained by differentiating a detected booster negative pressure with respect to time.

2. The control device for the electrically-driven vacuum pump as set forth in claim 1, wherein the predetermined condition includes a condition where the brake pedal is not operated, and
   the control part is programmed:
     to stop the operation of the vacuum pump and store the booster negative pressure at the timing of stopping the operation of the vacuum pump when the predetermined condition is satisfied, and
     to stop the operation of the vacuum pump when satisfied is a condition where the vacuum pump is operated, the brake pedal is operated and the booster negative pressure is larger than or equal to a stop negative pressure threshold set depending on the stored booster negative pressure.

3. The control device for the electrically-driven vacuum pump as set forth in claim 1, wherein the control device is programmed to start the operation of the vacuum pump when satisfied is a condition where the operation of the vacuum pump is stopped and the booster negative pressure is smaller than or equal to a predetermined pump operation start threshold.

4. The control device for the electrically-driven vacuum pump as set forth in claim 1, wherein the control device is programmed to start the operation of the vacuum pump when satisfied is a condition where the operation of the vacuum pump is stopped and the operation of the brake pedal is ended.

5. The control device for the electrically-driven vacuum pump as set forth in claim 1, wherein the vehicle further has a negative pressure sensor for outputting a signal representing the booster negative pressure, and the control part is programmed to acquire the booster negative pressure on the basis of the signal output from the negative pressure sensor.

6. The control device for the electrically-driven vacuum pump as set forth in claim 2, wherein the vehicle further has a brake operation detection device for outputting a signal representing the operation of the brake pedal, and the control part is programmed to judge whether or not the brake pedal is operated on the basis of the signal output from the brake operation detection device.

\* \* \* \* \*